(12) United States Patent
Wolfsberger

(10) Patent No.: US 11,090,847 B2
(45) Date of Patent: Aug. 17, 2021

(54) METHOD OF MANUFACTURING A PLASTIC FRAME FOR A TWO-WHEELER

(71) Applicant: Plastic Innovation GmbH, Ottensheim (AT)

(72) Inventor: Christian Wolfsberger, Ottensheim (AT)

(73) Assignee: PLASTIC INNOVATION GMBH, Ottensheim (AT)

( * ) Notice: Subject to any disclaimer, the term of this patent is extended or adjusted under 35 U.S.C. 154(b) by 303 days.

(21) Appl. No.: 15/740,107

(22) PCT Filed: Mar. 31, 2016

(86) PCT No.: PCT/EP2016/000536
§ 371 (c)(1),
(2) Date: Dec. 27, 2017

(87) PCT Pub. No.: WO2017/001031
PCT Pub. Date: Jan. 5, 2017

(65) Prior Publication Data
US 2018/0186049 A1    Jul. 5, 2018

(30) Foreign Application Priority Data

Jul. 2, 2015 (DE) ................... 10 2015 008 561.1

(51) Int. Cl.
*B29C 45/17* (2006.01)
*B29C 45/00* (2006.01)
(Continued)

(52) U.S. Cl.
CPC ...... *B29C 45/1711* (2013.01); *B29C 45/0046* (2013.01); *B29C 45/14631* (2013.01);
(Continued)

(58) Field of Classification Search
None
See application file for complete search history.

(56) References Cited

U.S. PATENT DOCUMENTS 4,541,649 A * 9/1985 Grunfeld .............. B22D 19/045
280/281.1
5,456,481 A * 10/1995 Allsop .................. B29C 45/006
280/274
(Continued)

FOREIGN PATENT DOCUMENTS

CN  103552220 A * 2/2014 ............ B62K 19/16
CN  103552220 A   2/2014
(Continued)

OTHER PUBLICATIONS

Espace translation of NPL CN103552220A (retrieved Sep. 2, 2020).*
(Continued)

*Primary Examiner* — Matthew J Daniels
*Assistant Examiner* — Paul Spiel
(74) *Attorney, Agent, or Firm* — McCoy Russell LLP

(57) ABSTRACT

The invention relates to a method of manufacturing a plastic frame for a two-wheeler having at least one hollow space in the interior by means of plastic injection molding having a series of method steps, wherein a fluid is injected to displace the plastic core from the component cavity after the injection of a preferably thermoplastic plastic melt into a closed injection molding tool.

19 Claims, 13 Drawing Sheets

(51) Int. Cl.
  *B62K 19/16* (2006.01)
  *B29C 45/14* (2006.01)
  *B62K 19/30* (2006.01)
  *B29L 31/30* (2006.01)

(52) U.S. Cl.
  CPC .. *B29C 45/14688* (2013.01); *B29C 45/14786* (2013.01); *B29C 45/1704* (2013.01); *B29C 45/1706* (2013.01); *B62K 19/16* (2013.01); *B62K 19/30* (2013.01); *B29C 2045/0087* (2013.01); *B29C 2045/1707* (2013.01); *B29C 2045/1712* (2013.01); *B29C 2045/1713* (2013.01); *B29C 2045/1719* (2013.01); *B29C 2045/1723* (2013.01); *B29C 2045/1726* (2013.01); *B29C 2045/1727* (2013.01); *B29L 2031/3091* (2013.01)

(56) References Cited

U.S. PATENT DOCUMENTS

| | | | |
|---|---|---|---|
| 5,533,742 | A | 7/1996 | Peart |
| 6,264,878 | B1 * | 7/2001 | Busby ............... B62K 19/16 264/314 |
| 2002/0153631 | A1 * | 10/2002 | Eckardt ............ B29C 45/1706 264/40.3 |
| 2006/0068206 | A1 * | 3/2006 | Hala ................. B29C 45/0013 428/411.1 |
| 2011/0210482 | A1 * | 9/2011 | Sakamoto ............... F24D 3/12 264/531 |
| 2012/0098232 | A1 | 4/2012 | Calabresse Muzzi |

FOREIGN PATENT DOCUMENTS

| | | |
|---|---|---|
| CN | 203581271 U | 5/2014 |
| DE | 69300067 T2 | 7/1995 |
| DE | 60209505 T2 | 11/2006 |
| DE | 102008046602 A1 | 3/2010 |
| DE | 102011100132 A1 | 10/2012 |
| DE | 102012011173 A1 | 12/2013 |
| EP | 0635349 A1 | 1/1995 |
| JP | H04208425 A | 7/1992 |
| WO | 9524332 A1 | 9/1995 |
| WO | 03006226 A1 | 1/2003 |
| WO | 2014193245 A1 | 12/2014 |

OTHER PUBLICATIONS

Michaeli, W. et al., "Die WIT auf dem Weg zur Serie," Kunststoffe, vol. 91, No. 3, Mar. 2001, 3 pages. (See NPL 6, International Search Report issued in PCT/EP2016/000536).

Knights, M. "Water Injection Molding Makes Hollow Parts Faster, Lighter," Plastics Technology Website, Available Online at https://www.ptonline.com/articles/water-injection-molding-makes-hollow-parts-faster-lighter, Available as Early as Apr. 2002, Published Online Mar. 24, 2004, 6 pages.

Drummer, D. et al., "Hohlkörperverbundstrukturen im Minutentakt," Kunststoffe, Mar. 2011, 5 pages. (See NPL 6, International Search Report issued in PCT/EP2016/000536).

"BASF and SGL entwickeln reaktive Polyamid-Carbonfaser-Composite," Plastverarbeiter website, Available Online at http://www.plastverarbeiter.de/14452/basf-und-sgl-entwickeln-reaktive-polyamid-carbonfaser-composite/, Oct. 11, 2012, 1 page. (See NPL 6, International Search Report issued in PCT/EP2016/000536).

ISA European Patent Office, International Search Report Issued in Application No. PCT/EP2016/000536, dated Jun. 17, 2016, WIPO, 8 pages.

* cited by examiner

METHOD OF MANUFACTURING A PLASTIC FRAME FOR A TWO-WHEELER

CROSS-REFERENCE TO RELATED APPLICATIONS

The present application is a U.S. National Phase of International Patent Application Serial No. PCT/EP2016/000536, entitled "METHOD FOR PRODUCING A PLASTIC FRAME FOR A TWO-WHEELED VEHICLE," filed on Mar. 31, 2016. International Patent Application Serial No. PCT/EP2016/000536 claims priority to German Patent Application No. 10 2015 008 561.1, filed on Jul. 2, 2015. The entire contents of each of the abovementioned applications are hereby incorporated by reference in their entirety for all purposes.

TECHNICAL FIELD

The invention relates to a method of manufacturing a plastic frame for a two-wheeler having at least one hollow space in the interior. At two-wheeler in the sense of the invention can, on the one hand, be a conventional bicycle or an electric bicycle. A two-wheeler is, however, furthermore also to be understood as a two-wheeler having a motor/engine such as a motor-assisted bicycle, a moped or a motorcycle.

BACKGROUND AND SUMMARY

It is already known to manufacture bicycle frames from plastic. For this purpose, a resin injection process is typically used that is known under the name "resin transfer molding"®. In this method, glass fiber fabric and/or carbon fiber fabric are placed into a molding tool. With a closed tool, the fabric is saturated with a thermosetting matrix material such as an epoxy resin or polyurethane that is injected into the tool. The thermosetting matrix materials usually comprise two base substances that have to be mixed well with one another before the introduction into the tool. A chemical reaction takes place after the mixing and the injection into the tool. The component can be demolded after a corresponding conversion of the reactants.

The glass fiber fabrics or carbon fiber fabrics are typically placed into the tool in a three-dimensionally woven state. An inflatable hose is typically placed into the interior of the fabric so that the hose can be inflated by a fluid in the component interior after the resin injection so that the desired hollow space hereby arises. The fluid introduced under pressure is released after the end of the reaction of the reactants. The hardened component can then be removed.

Bicycle frames comprising thermosetting matrix material have the great disadvantage that they cannot be sensibly recycled due to the selected material. Apart from a thermal exploitation by combustion, there is no reasonable recycling for the correspondingly manufactured components.

It is the object of the present invention to provide a method for manufacturing a plastic frame for a two-wheeler in which a plastic can be used that enables a sensible recycling of the two-wheeler frame.

In accordance with the invention, a method of manufacturing a plastic frame for a two-wheeler having at least one hollow space in the interior by means of plastic injection molding is provided to achieve this object, the method comprising the following steps:

injecting a thermoplastic plastic melt into a closed injection molding tool;

injecting at least one fluid to displace a plastic core from the component cavity; and at least briefly maintaining fluid pressure in the component interior.

The method in accordance with the invention comprises at least the following steps:

injecting a thermoplastic plastic melt into a closed injection molding tool;

injecting a fluid to displace the plastic core from the component cavity; and at least briefly maintaining the fluid pressure in the component interior.

In the method in accordance with the invention, the cavity of the closed injection molding tool forms the geometry of a two-wheeler frame, for example of a bicycle frame, with the tool being equipped with at least one injector for the introduction of a fluid. The fluid is able to displace the plastic core and thus to achieve a tubular cross-section. The fluid can be injected with a regulation of volume flow or pressure/time via a preset profile. The cool-down phase of the hot plastic melt can be substantially reduced by the tubular cross-section due to the comparatively thin remaining residual wall thickness. This means that only a comparatively brief cooling time is required. Overall a very substantial cooling time reduction can be anticipated with respect to a frame composed of solid material. The total time for the manufacture of a two-wheeler frame can be substantially shortened due to the faster cooling time. These components can thus be produced even more cost-efficiently. The mass of the total two-wheeler frame is furthermore considerably reduced due to the hollow space at the component interior, which not only brings about a weight advantage, but also in particular an economic advantage. A higher stiffness can also be assumed with a closed tubular cross-section. When a tubular cross-section is spoken of here, it can naturally be formed as circular, oval, polygonal, and in any other desired shape.

Advantageous embodiments of the invention result from the dependent claims.

The fluid is advantageously blown out and/or sucked out after an at least brief maintenance of the fluid pressure.

The fluid can accordingly press the plastic core, for example, into a secondary cavity provided in the injection molding tool.

In accordance with an alternative embodiment of the invention, the fluid can press the plastic core via a mass back pressure process through the heating passage or partial hot passage or cold passage of the plastic injection machine located in the injection molding tool into the screw antechamber.

In accordance with a further advantageous embodiment of the method in accordance with the invention, the injection molding tool can only be partially filled with the advantageously thermoplastic plastic melt, with the plastic core being displaced in that the preferably thermoplastic plastic melt is inflated such that it contacts the wall of the injection molding tool while forming a hollow space. This method variant, known as an inflation method, enables a very economic use of the plastic to be provided for forming the frame.

In accordance with a further advantageous embodiment of the invention, a correspondingly large core can be used during the injection molding process in the region of parts to be integrated into the plastic frame such as a steering head bearing and/or a bottom bracket bearing and/or a motor and/or a storage battery so that this region is hollow after the component demolding. The respective component, that is, for example, the steering head bearing, the bottom bracket bearing, the motor, the storage battery or a plurality of these parts can be inserted into the recess formed in this manner.

In accordance with an alternative advantageous process, the parts and/or components to be integrated into the plastic frame such as the steering head bearing and/or the bottom bracket bearing, a threaded screw fitting for drinking bottles, reflectors, brake lines, cables for transmitting current and/or electronic signals, localization systems (e.g. a GPS localization system), storage batteries and/or motors can be held individually or in groups by means of a holding apparatus and can be overmolded with plastic. The assembly of the two-wheeler can take place in a particularly efficient manner by this process.

In accordance with a further embodiment of the invention, a design film and/or functional film and/or a tape of carbon fiber fabric or glass fiber fabric can be placed into the tool before the injection of the plastic melt and can be back-injection molded with the plastic melt. This film can naturally also be used as a combination film that has a specific desired design and also a specific functionality. Such a functionality could, for example, be a capacitive sensor system via which the two-wheeler light is switched on or off.

Another advantageous embodiment of the invention in turn provides that parts of the two-wheeler frame such as the middle strut are placed into the injection molding tool as a finished part composed of plastic, aluminum or another material and are connected to the plastic that is advantageously thermoplastic during the injection process.

To form a constant inner diameter, a projectile can additionally be used that has a cross-section corresponding to the hollow space of the plastic frame and that is driven forward through the shaping cavity of the injection molding tool by means of the fluid pressure.

Although the fluid primarily serves the formation of the hollow space in the plastic frame, it can thereby be provided with a second benefit in that it is conducted in a circulation flow after the formation of the hollow space so that it now serves the cooling of the plastic material that is still very hot directly after the injection process.

A plastic that is selected from the following group can advantageously be used in the method in accordance with the invention:

Polyamide, preferably polyamide 12, polyamide 6 or polyamide 6.6, polypropylene, polyethylene, polyethersulfone, polyetherimide, polyetherketone, polyphenylene sulfide, polyvinyl chloride, polyester, acrylonitrile butadiene styrene (ABS), polycarbonate/acrylonitrile butadiene styrene (ABC/PC), polycarbonate (PC), and particularly preferably polybutylene terephthalate or polyterephthalate ethylene.

These materials can also be selected and used here individually or in combination. The selected plastics can furthermore also be reinforced via short fibers and/or long fibers composed of glass fibers, carbon fibers and/or natural fibers.

The plastic can alternatively also be injected in the injection molding tool as a caprolactam with an associated activator.

The injected fluid can advantageously be water and/or a gas. This fluid is injected via at least one injector arranged in the tool.

In accordance with a particular embodiment of the invention, a direct contact between the fluid and the plastic melt is prevented when the fluid is introduced into a hose surrounded by the plastic melt.

On an introduction of a plurality of fluid volume flows by a plurality of injectors, said injectors can be particularly advantageously regulated separately from one another.

Further features, details and advantages will be explained in more detail with reference to embodiments that are shown in the drawing and that are partly shown in the Figures.

DETAILED DESCRIPTION

The general method routine for the method in accordance with the invention for manufacturing a two-wheeler plastic frame can be explained with reference to the first embodiment of the present invention in accordance with FIGS. 1 to 5.

Figure 1:
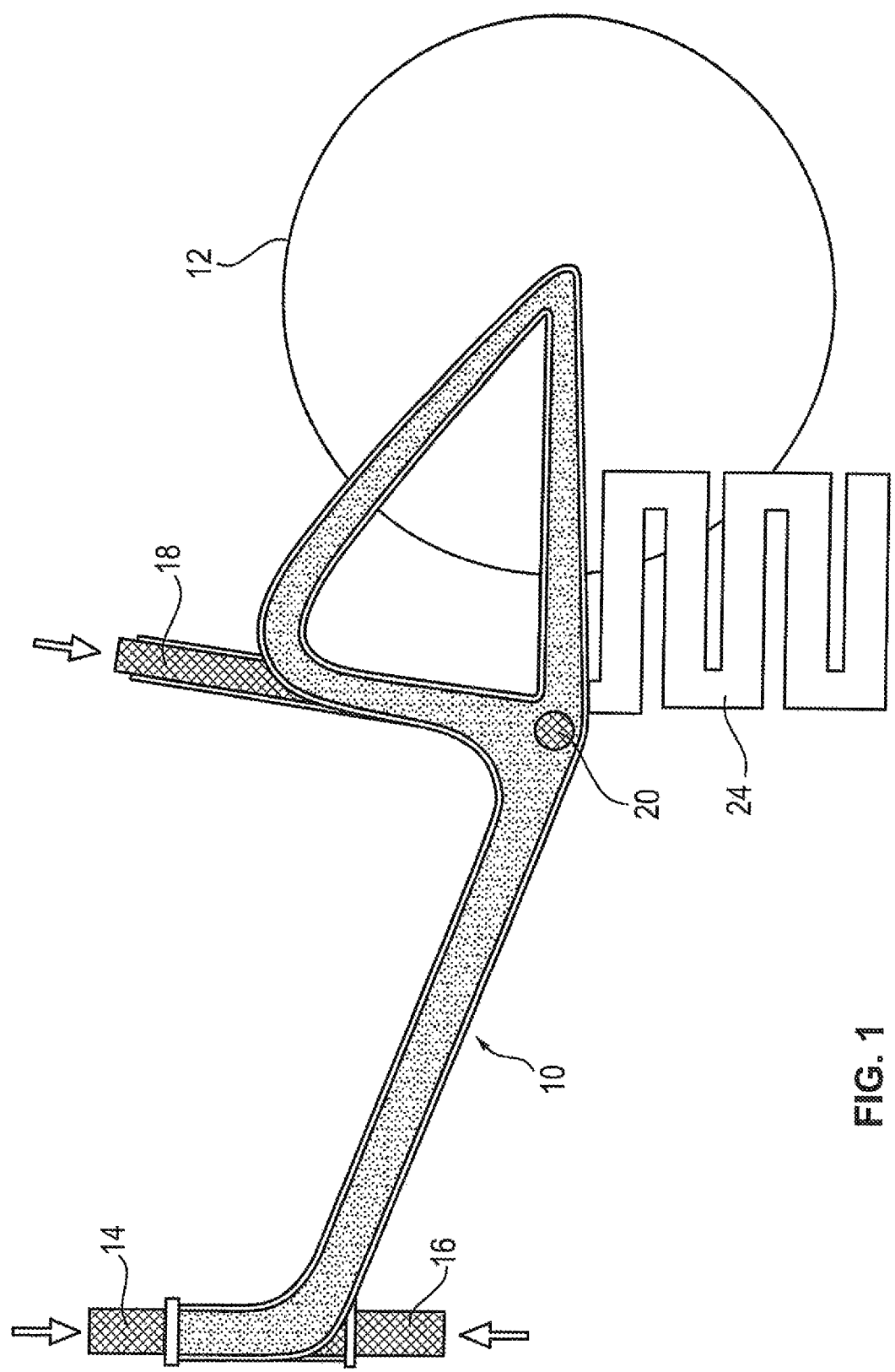
FIGS. 1 to 5 show the plastic frame of a woman's bicycle in accordance with a first embodiment of the invention in different schematically shown method stages.
Figure 2:
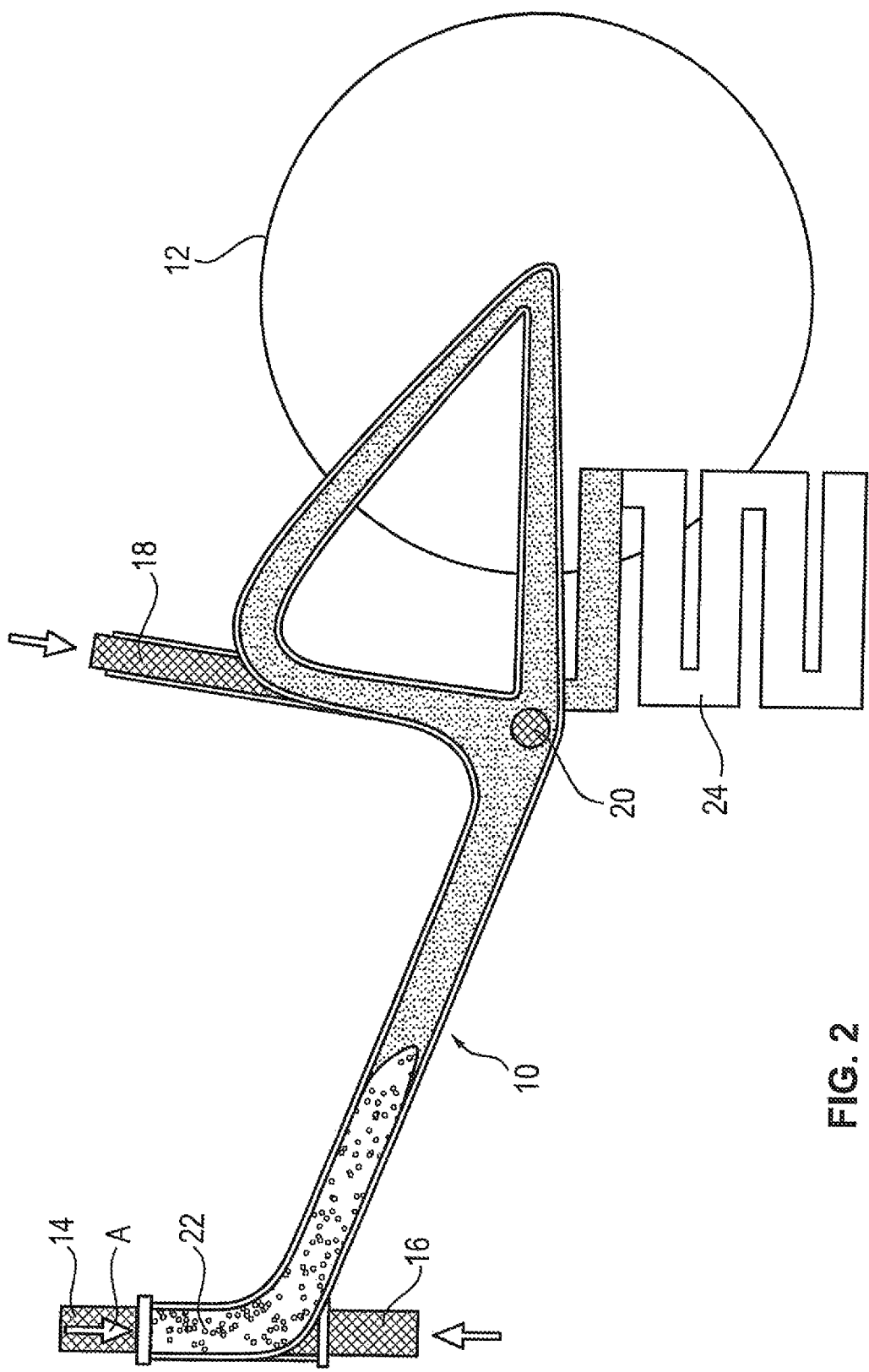

The frame 10 of a woman's bicycle is thus shown schematically in FIG. 1. The back wheel 12 arranged at the rear part of the frame is shown schematically. The thermoplastic plastic melt has just been injected into the closed shaping tool, not otherwise shown in more detail, in FIG. 1. At the same time, sliders or cores 14, 16 and 18 have been pushed into the shaping tool in the respective arrow direction so that the prevent a penetration of the injected plastic melt into this region. The sliders 14 and 16 here form cavities for the steering head bearing; the slider 18 forms a cavity for receiving the seat tube to be attached later; and a slider 20 inserted perpendicular to the plane of the drawing forms the hollow space in which the bottom bracket bearing is later arranged. In accordance with FIG. 2, a fluid 22 is now pressed in the arrow direction of the arrow A through an injector, not shown in any more detail here, that displaces the so-called plastic core from the component interior. A part of the core has already been displaced in FIG. 2. The excess plastic material is pressed into a secondary cavity 24 in this embodiment. The secondary cavity or overflow cavity 24 can here be opened and closed hydraulically, pneumatically and/or electrically via a slider.

Figure 3:
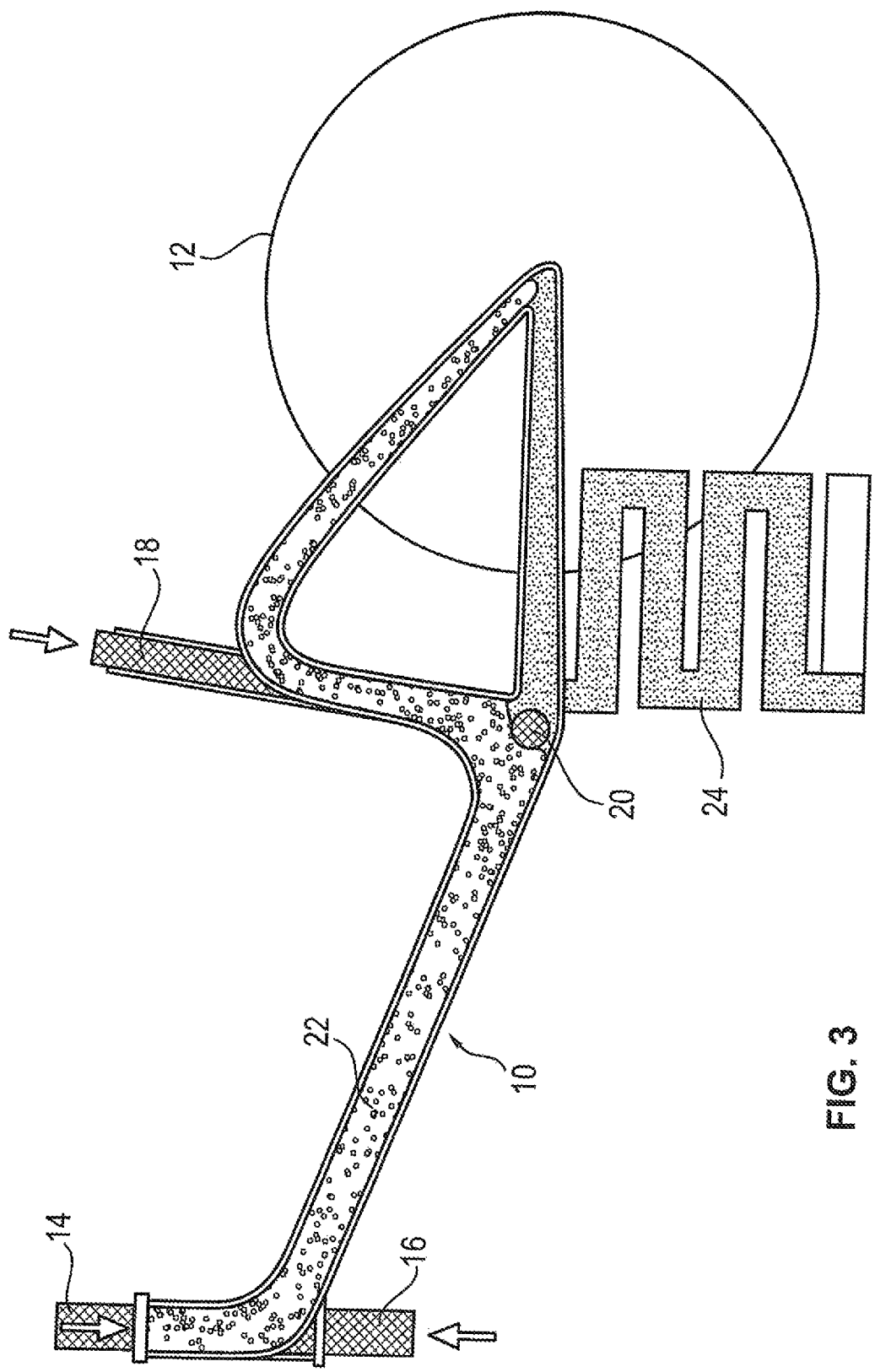
Figure 4:
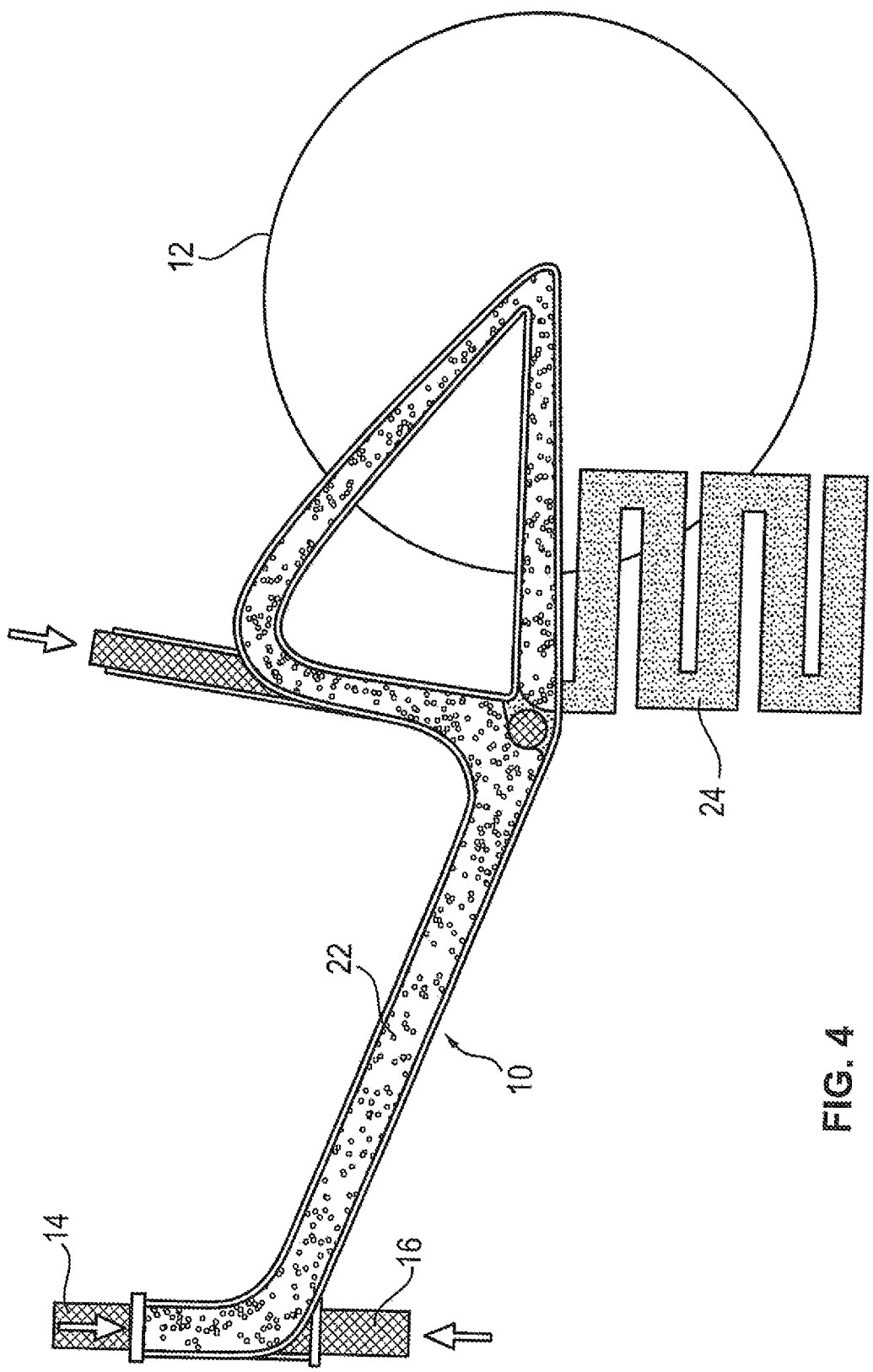
Figure 5:
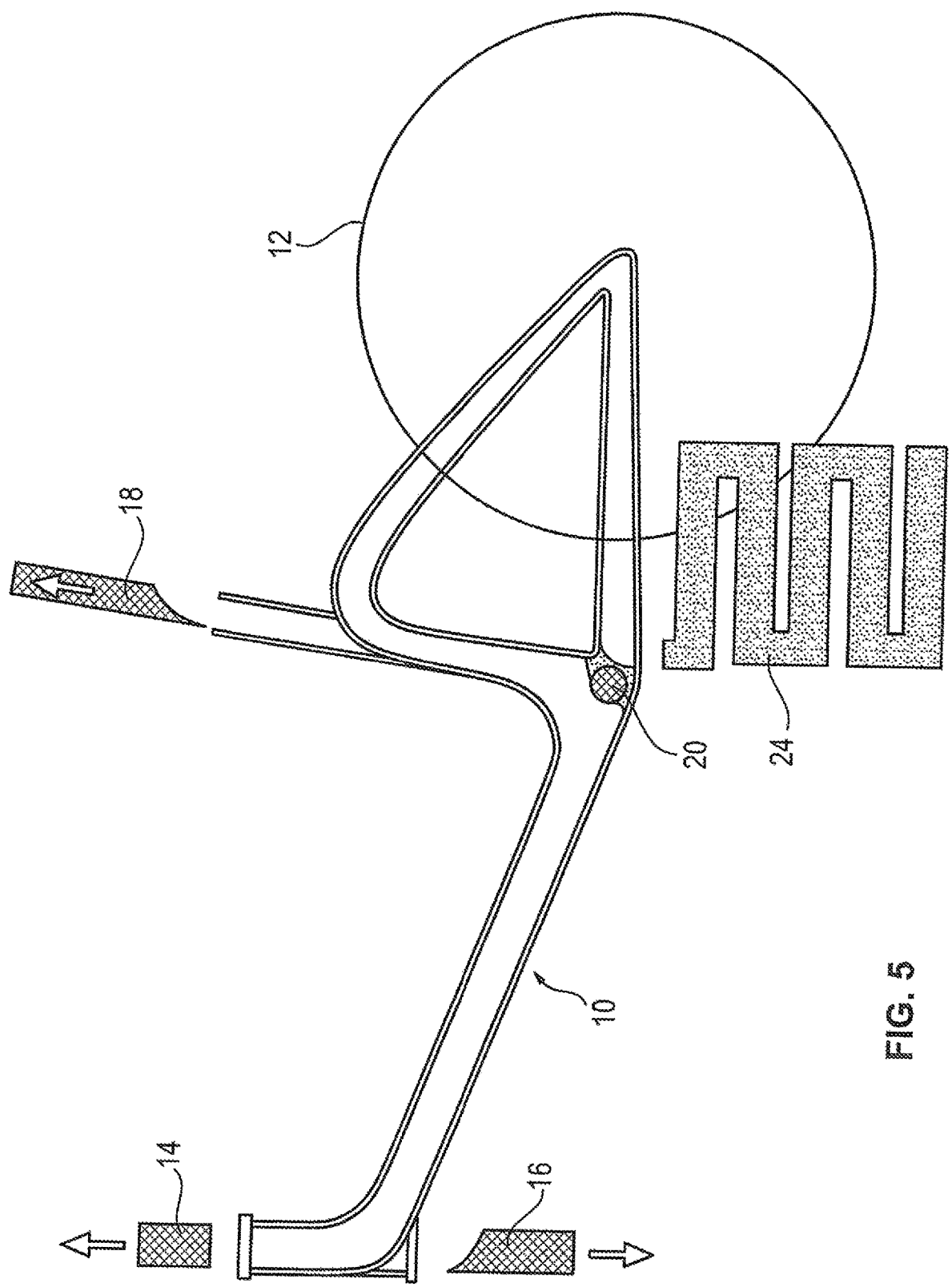
Figure 6:
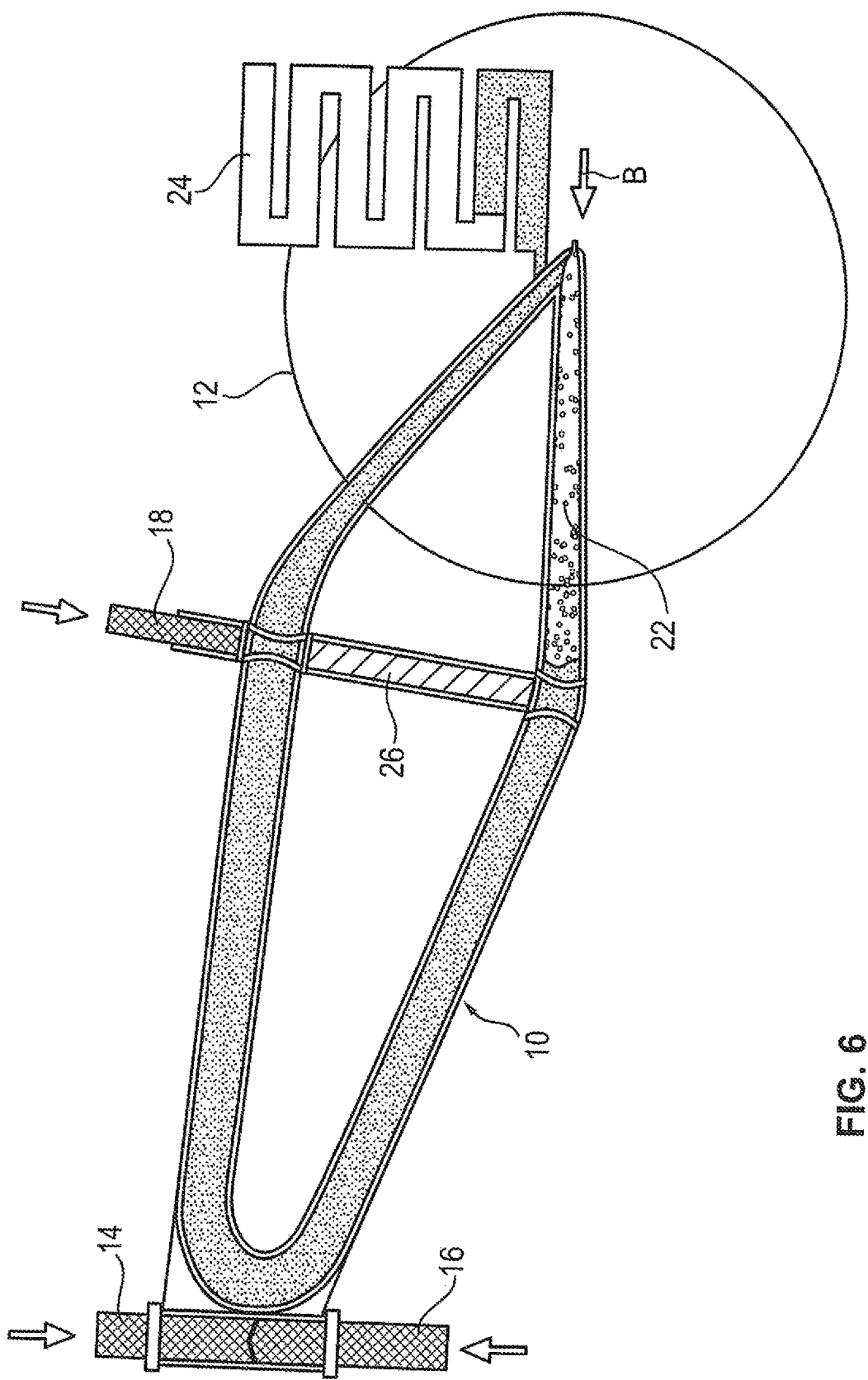
FIGS. 6 to 10 show a plastic frame of a men's bicycle in accordance with a second embodiment of the invention in different schematically shown method stages.
Figure 7:
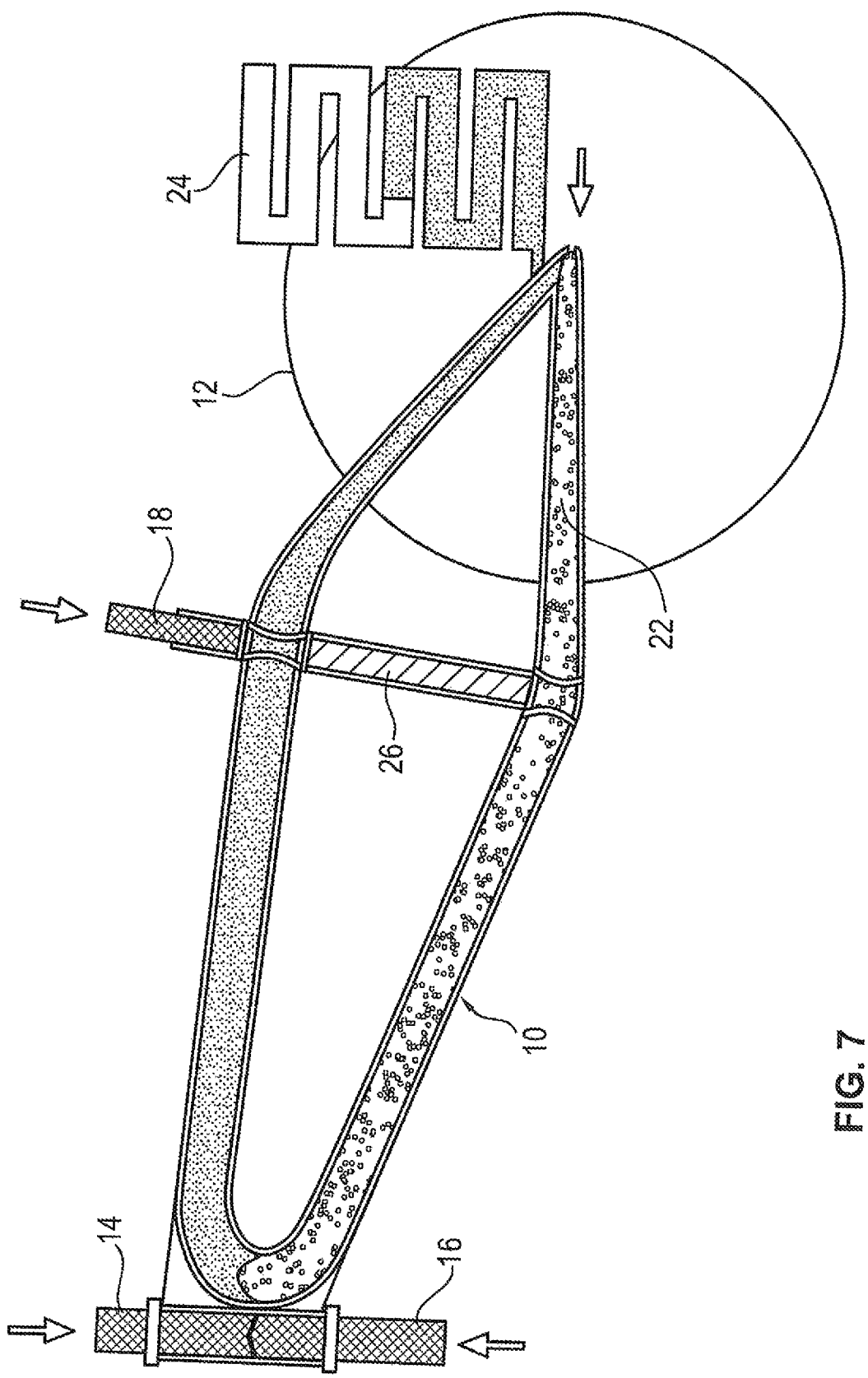
Figure 8:
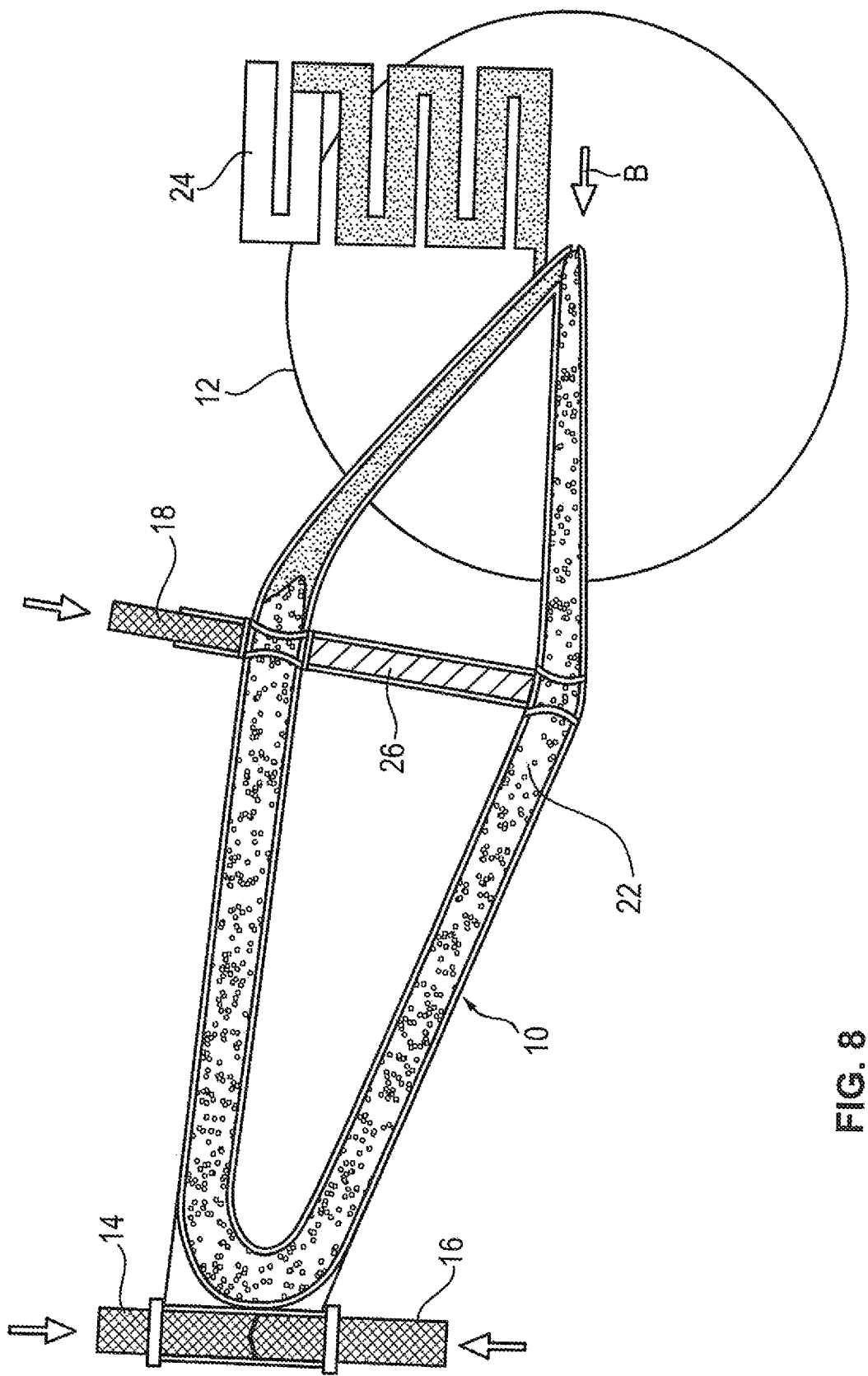
Figure 9:
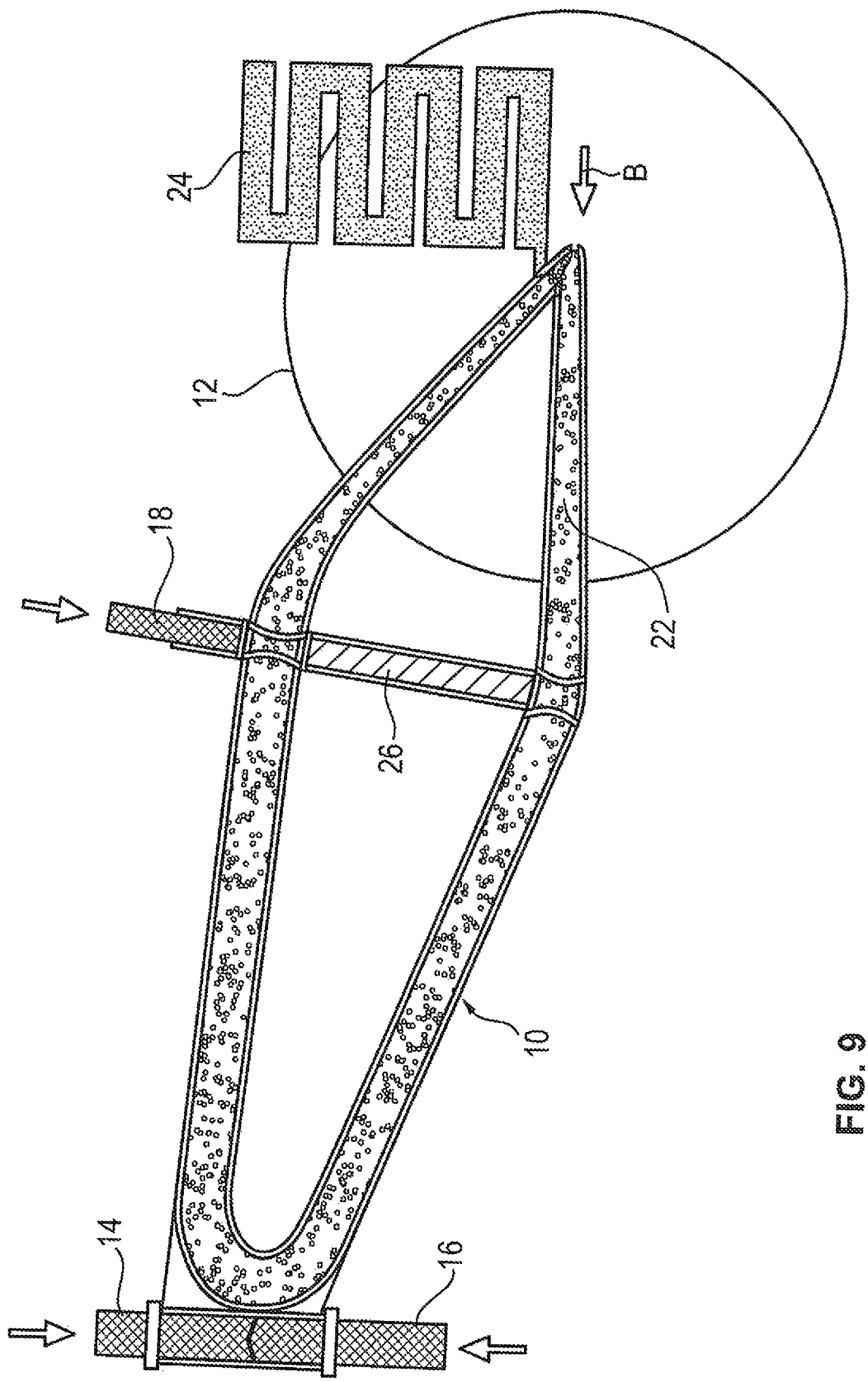
Figure 10:
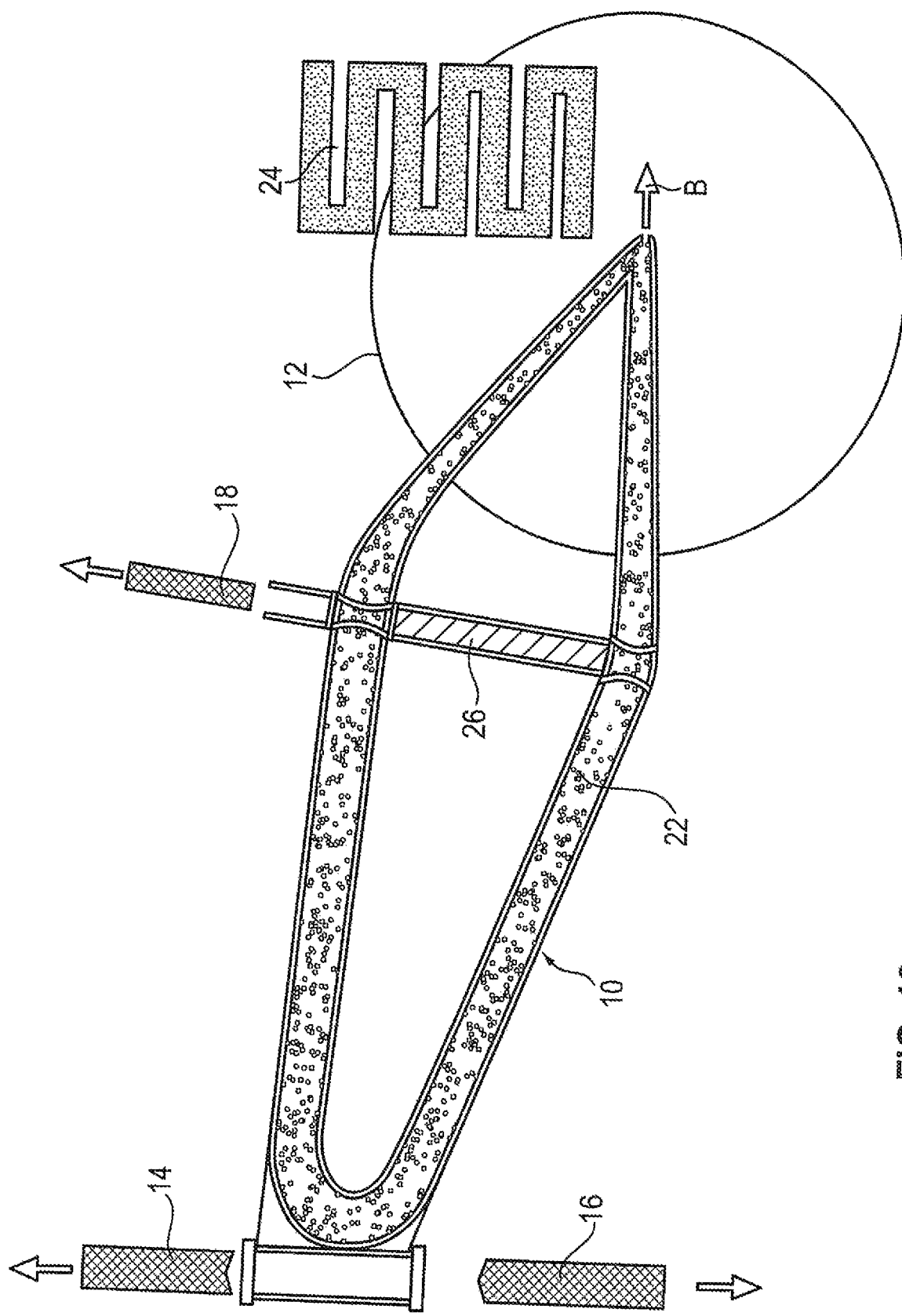

A larger part of the frame 10 is already correspondingly filled with the injected fluid in FIG. 3. In FIG. 4, the fluid injection and the displacement of the plastic core from the frame region are ended on the whole. In accordance with the representation of FIG. 5, the sliders 14, 16, 18, and 20 are pulled out in the corresponding arrow direction after a corresponding cooling down of the plastic material and the secondary cavity 24 is separated.

In the aforesaid embodiment, the cavity of the closed injection molding tool forms the geometry of the bicycle frame in a manner not shown in any more detail. The tool, not shown here, is equipped with at least one injector for the introduction of the fluid 22 that can comprise gas, water, or a mixture of gases or of water with gas or gases. The fluid for displacing the plastic core can be injected with volume flow regulation or also with pressure/time regulation via a preset profile. The cooling down phase of the hot plastic melt only relates to the remaining residual wall thickness due to the tubular cross-section. This means that a huge cooling time reduction is achieved with respect to the cooling down of a solid frame. The faster cooling time correspondingly also cuts the total cycle time and the components can therefore be produced very cost-efficiently. The mass of the total two-wheeler frame is reduced by the hollow space at the component interior, which not only brings about a weight advantage, but also an economic advantage. A higher stiffness is also generally produced by a closed tubular cross-section than with a solid material frame.

The complete method routine for manufacturing the two-wheeler frame will be shown in the following in the form of the method steps to be carried out. The step sequence advantageously runs as follows:
1. closing the injection molding tool;
2. closing force build-up;
3. injecting the thermoplastic plastic melt;
4. selectively, only a slight post-pressure time of approximately two seconds;
5. opening at least one injector in the tool and start of the fluid injection;
6. displacing the plastic core from the component cavity by means of the fluid;
7. maintaining the fluid pressure in the component interior for a brief time (effect as with a post-pressure);
8. selectively, flushing process in the component interior by means of the same fluid or of a different fluid to achieve a better cooling effect;
9. blowing out the fluid (or sucking out by means of a vacuum);
10. opening the tool; and
11. ejecting the component.

It must be noted with this step sequence that step 9 is not necessarily carried out. When gas is used as the injected fluid, it can also remain in the component. The fluid used can comprise water or gas. It can, however, also comprise both media since, for example, an air bubble is pushed ahead of the water or with nitrogen first being used for forming the hollow space and subsequently $CO_2$ being used for cooling the component.

The displacement of the plastic core can take place in different manners. The blowing out into a secondary cavity is shown in the embodiment in accordance with FIGS. 1 to 5. Instead of this process, however, a pressing back of the material of the plastic core into the screw antechamber could also take place via the fluid 22. This process is also called a mass back pressing. Finally, an inflation process can also be used, with here a smaller quantity of thermoplastic being filled into the injection molding tool that is then inflated. The quantity is determined here such that no material is displaced from the injection molding tool on the inflation.

In the embodiment shown, polyamide or a polyolefin is preferably used as the thermoplastic plastic material that is reinforced via glass fibers and/or carbon fibers and/or natural fibers.

To design the frame 10 to be as stiff as possible, so-called tapes or organic sheets, i.e. fabrics of glass fibers, natural fibers or carbon fibers, can be placed into the tool in specific regions. They are then back-injection molded with the plastic melt. The tapes can be positioned and held by a special apparatus in the tool. The frame has more stiffness in the critical regions, such as in the region of the bottom bracket bearing or steering head bearing due to the target-oriented fiber alignment of the tapes/organic sheets. To achieve the best possible connection between the tapes and the thermoplastic plastic melt, the tapes can particularly advantageously be preheated to a specific temperature before the placing into the tool, with this specific temperature having to be selected in dependence on the matrix material of the tape.

To avoid a later additional effort for the installation and attachment of additionally required components for the finished bicycle frame after the injection molding, the required components such as bottom bracket bearings and/or steering head bearings, thread sleeves for drinking bottle holders, the retainer for storage batteries on a configuration as an electric bicycle or, for example, the holder for a conventional motor in the case of the use of the invention within the framework of motor-powered two wheelers such as motorcycles can be immediately placed into the injection molding tool and overmolded. The method routine can thus be substantially simplified in the production process since the bicycle frame can be removed immediately with the required components from the injection molding tool with this method step.

The frame can be provided with a printed design via films to produce an attractive and individual design. They are placed into the tool and back-injection molded. This is also called "in-mold labeling" or "in-mold decoration". Functionalities can also be achieved via functionalized films instead of the pure design films. These films provided with the functionality are likewise placed into the tool and back-injection molded with the plastic material. The functionalized films can, for example, be printed traces or a capacitive sensor system optionally having an applied microcontroller. They can, however, also include transponder properties. Film could also be functionalized with a GPS signal, with this then being able to be used for security against theft.

Due to the positive property that the frame consists of plastic and is therefore not conductive, interference-free signals, data and/or energy can be transmitted or transferred via the introduced and/or applied functionality. An additional cabling to conduct the produced energy from an energy-generating unit such as a dynamo to the consumer, for example to the bicycle lamp, could also be substituted by means of a correspondingly functionalized film.

In the process shown above in detail, a modification can also take place within the framework of the invention. A corresponding end product can also be generated by means of an in-situ polymerization. For this purpose, for example, when polyamide, that is also a thermoplastic, is used, the production process will be as follows on the use of this starting material:
placing a continuous fiber reinforced fabric of glass fibers and/or carbon fibers and/or natural fibers into a shaping tool. The inserted fabrics are advantageously deformed three-dimensionally to form the component geometry or are woven and impregnated by means of the process "tailored fiber placement" so that a mixed plastic mass comprising caprolactam and an activator is present that is introduced into the tool via a mixing apparatus such that the fabric placed in the tool is flooded;
increasing the temperature and pressure in the tool interior and thereby polymerizing the introduced plastic mass; and
removing the two-wheeler frame from the tool after completed polymerization.

The frame comprising the thermoplastic matrix material can be recycled and thereby reused at any time.

In this process, the injected fluid should not come into contact with the plastic melt in the frame interior. A hose is therefore placed into the tool for in-situ polymerization. The hose here serves as the core and can be inflated by means of the fluid pressure in the cavity. The fluid in the hose is pressurized during the polymerization. This pressure produces an improved component quality in the method, with the pressure being able to vary over time (pressure/time profile). The inflated hose forms the hollow space.

A bicycle frame 10 such as was explained in the first embodiment with reference to FIGS. 1 to 5 can be produced from a single polymer, but also from a mixture of a plurality of polymers. Polyamides or polyolefins are generally particularly recommendable for the frame. TPE or TPU can, however, also be injected into the tool as further components. They do not necessarily have to be provided with a hollow space, but rather frequently serve the overmolding or as a jacket of the first component.

A further embodiment of the invention is shown schematically with reference FIGS. 6 to 10. The method for manufacturing a men's bicycle is shown here. The bicycle frame 10 therefore has a shape differing from the bicycle frame in accordance with the first embodiment of FIGS. 1 to 5 such as is characteristic for a men's bicycle. The same components are also substantially marked with the same reference numerals here. The step sequence of the manufacturing process such as is shown in FIGS. 6 to 10 substantially also corresponds to that in accordance with FIGS. 1 to 5 of the first embodiment. However, in this example, a middle strut 26 of aluminum or of another material is placed into the injection molding tool so that it bonds with the thermoplastic during the injection molding process. This middle strut 26 also has the reception opening for the seat support to be inserted later and can also be filled with another material, preferably polyurethane, for technical process reasons or also for other reasons.

The fluid 22 in the embodiment shown here is injected in the arrow direction of the arrow B to displace the plastic core. In FIGS. 6 to 10, the respective progress of the displacement of the core is shown, with the plastic core also being displaced into a secondary cavity 24 here.

Figure 11:
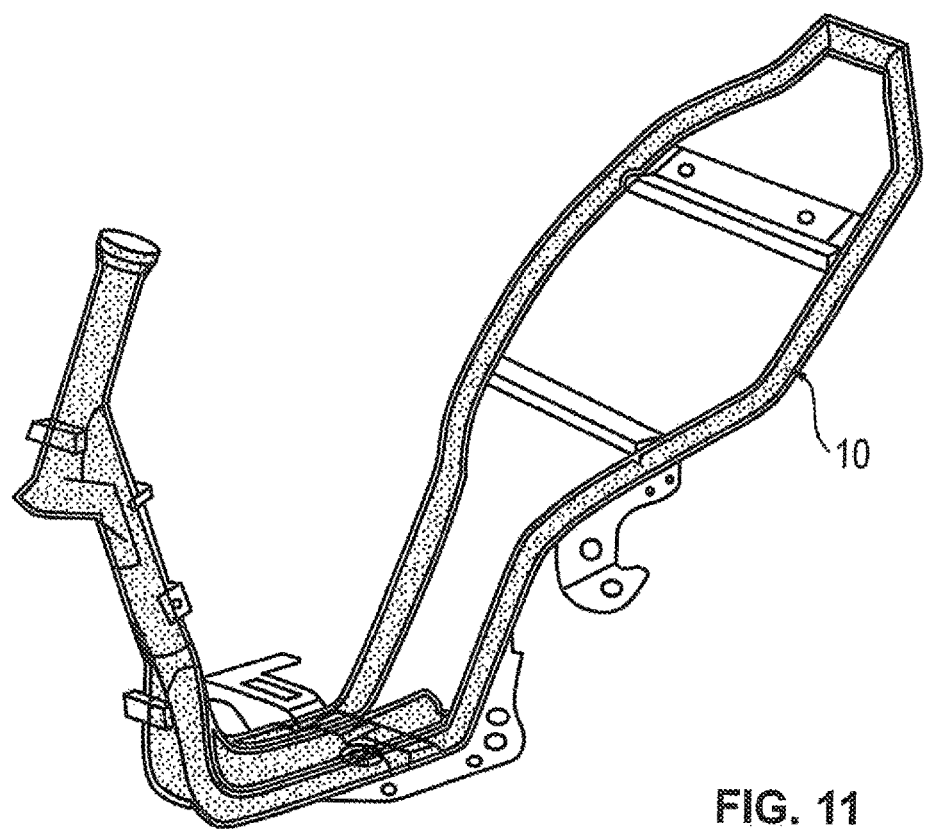
FIGS. 11 to 15 show the plastic frame of a scooter in accordance with a third embodiment variant of the present invention in different schematically shown method stages.

However, not only bicycle frames can be manufactured using the method in accordance with the invention. The manufacture of a frame for a scooter (motor scooter) is shown schematically with reference to the third embodiment in accordance with FIGS. 11 to 15. This is a powered two-wheeler. The somewhat more stable and more complex frame of the scooter 10 results from the representation in accordance with FIG. 11. As also above with the bicycle frame, only the plastic material is shown here and not the closed injection molding tool.

Figure 12:
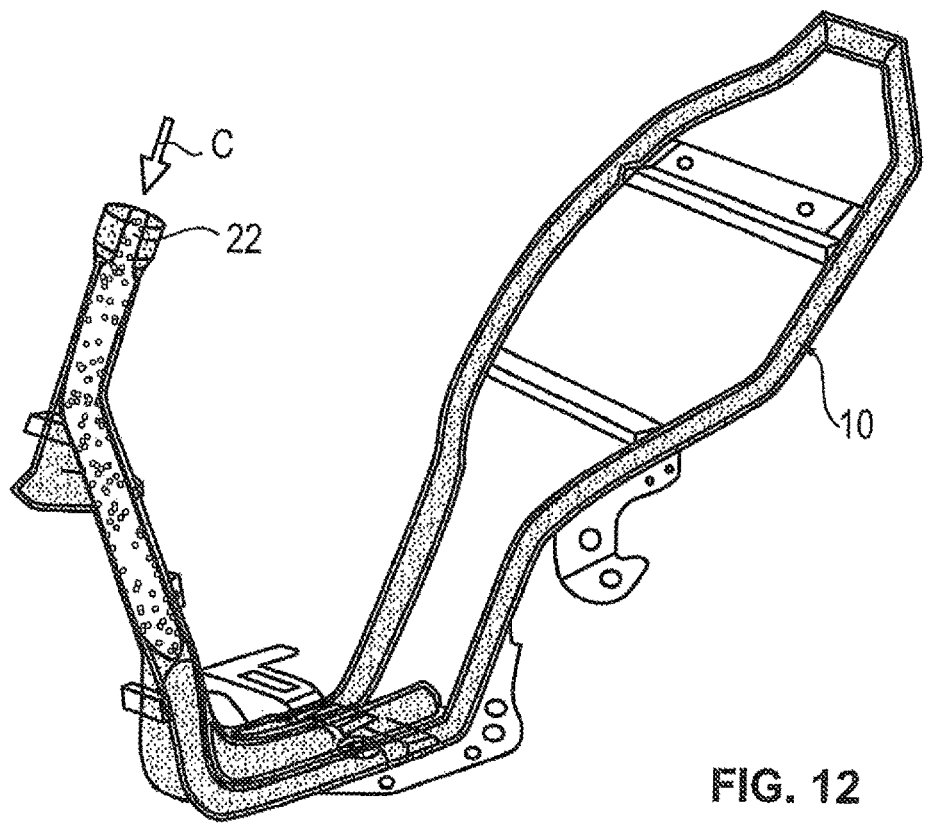
Figure 13:
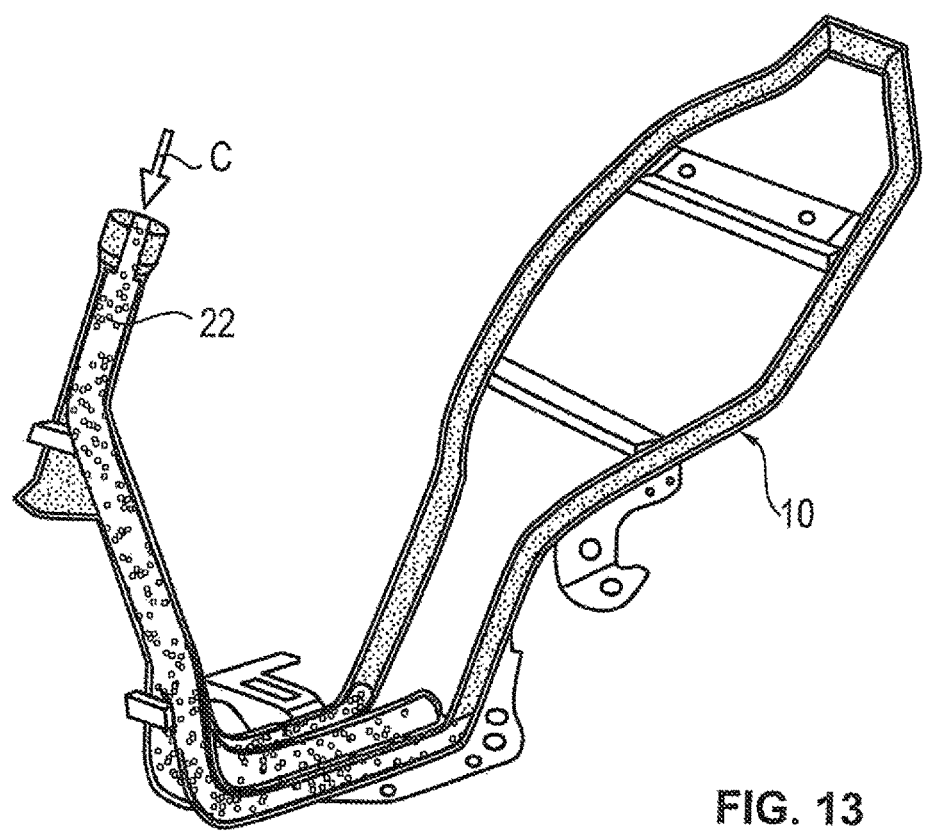
Figure 14:
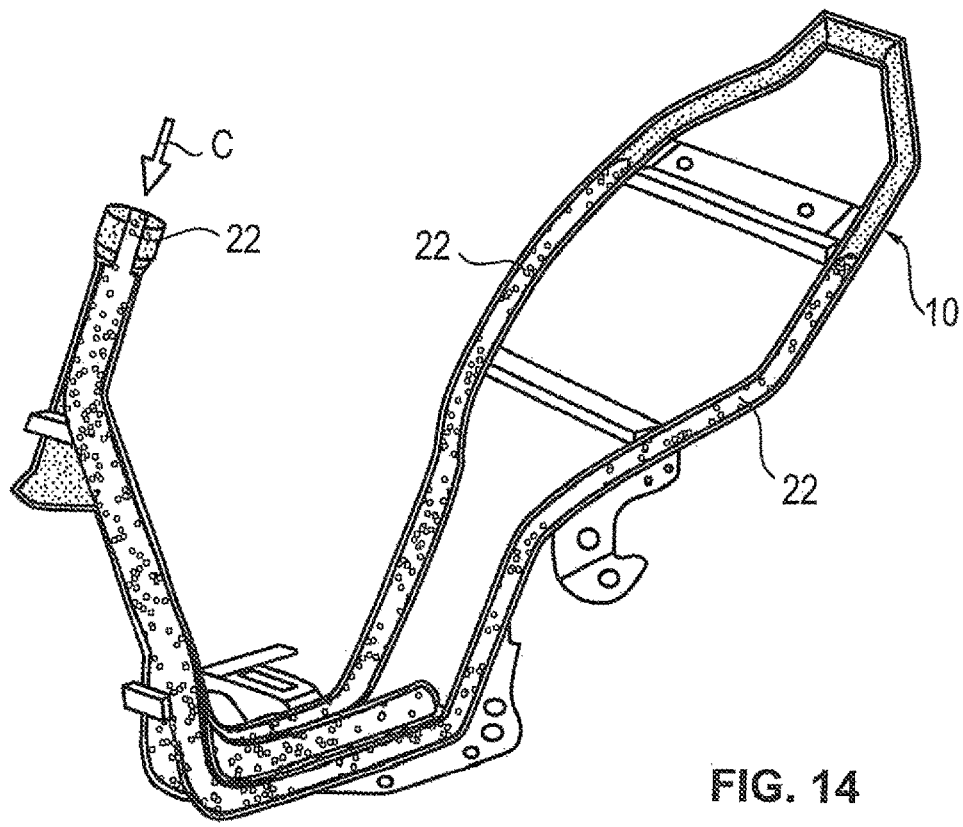
Figure 15:
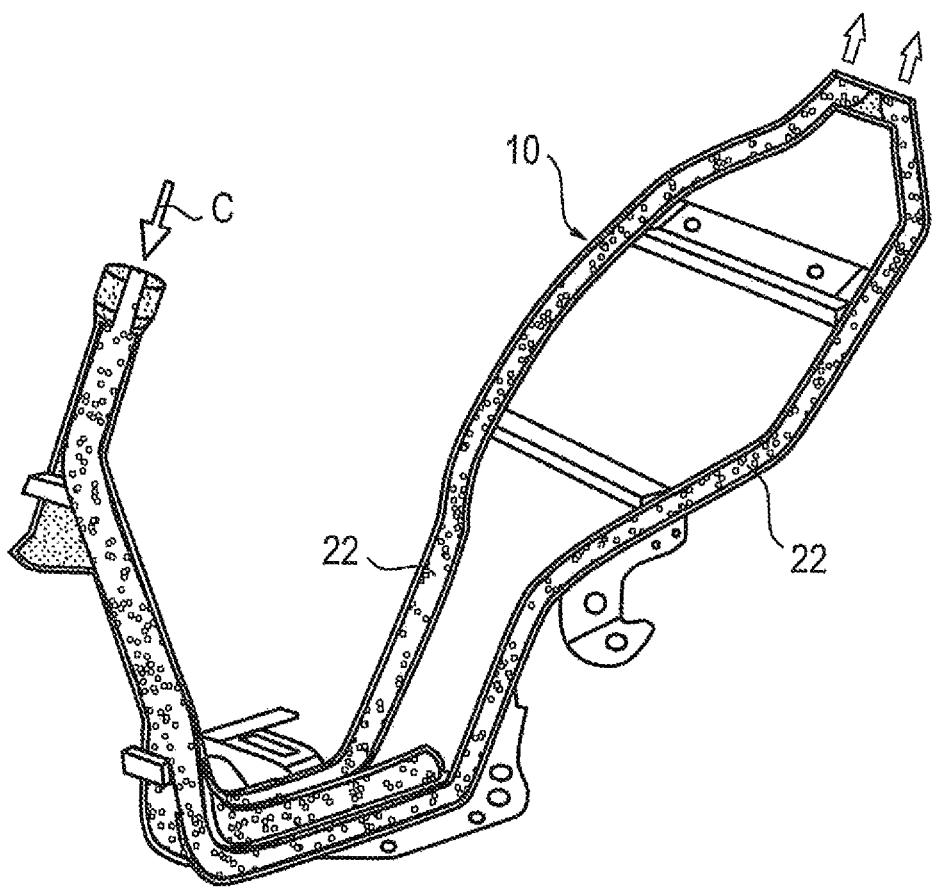

The fluid is injected in arrow direction C in accordance with FIG. 12. It increasingly displaces the plastic core, with the respective progress stages of the displacement of the core being shown in FIGS. 13 to 15. The secondary cavity that adjoins behind the frame or that also receives the injection molding tool with a hot passage, a partly hot passage or a cold passage (for the mass back pressure process) and the displaced plastic material is not shown in any more detail in this embodiment. It can be shown with reference to this more complex example that the simple and fast manufacturing process for a two-wheeler frame can also be used with powered two-wheelers having a more complex frame structure.

The invention claimed is:

1. A method of manufacturing a plastic frame for a two-wheeler, said method comprising the following steps:
   injecting a thermoplastic plastic melt into a closed injection molding tool defining an exterior of the plastic frame;
   after injecting the thermoplastic plastic melt, injecting at least one fluid into a first end of the closed injection molding tool and flowing the at least one fluid through thermoplastic melt to force a plastic core of the injected thermoplastic plastic melt through a first tube of the closed injection molding tool and a second tube of the of the closed injection molding tool and toward a second end of the closed injection molding tool, wherein the displacement of the plastic core forms an interior hollow space of the two-wheeler frame and the plastic core is displaced from the first end, through the first tube and the second tube of the closed injection molding tool before being forced out of the second end, wherein the first tube and the second tube of the closed injection molding tool form tubes on opposing sides of the two-wheeler frame; and
   at least briefly maintaining fluid pressure in the interior hollow space;
   wherein parts of the two-wheeler frame are placed in as a finished part composed of plastic, aluminum, or of another material and are bonded to the thermoplastic plastic melt during the injection molding process.

2. The method in accordance with claim 1, wherein the fluid is blown out and/or sucked out after a brief maintenance of the fluid pressure in the interior hollow space.

3. The method in accordance with claim 1, wherein the fluid presses and displaces the plastic core into a single secondary cavity provided in the injection molding tool and the secondary cavity is positioned at a distal end of the closed injection molding tool from the injection at the first end such that the plastic core must travel the entire flow path of the closed injection molding tool before exiting into the secondary cavity.

4. The method in accordance with claim 1, wherein at least one shaping cavity portion of the injection molding tool is only partially filled with the thermoplastic plastic melt; and in that the plastic core is displaced by the injection of the fluid so that the thermoplastic plastic melt is inflated such that the thermoplastic plastic melt contacts a wall of the injection molding tool while forming the hollow space of the plastic frame and the shaping cavity is then completely filled.

5. The method in accordance with claim 1, wherein a correspondingly shaped core is inserted during the injection molding process in a region of parts to be integrated into the plastic frame such that the region is hollow after the component demolding, wherein the core is one of the following: inserted, hydraulically travelable, pneumatically travelable, or electrically travelable.

6. The method in accordance with claim 1, wherein parts and/or components to be integrated into the plastic frame are inserted into the injection molding tool individually or in groups, are held in the injection molding tool by means of an apparatus and are overmolded with plastic.

7. The method in accordance with claim 1, wherein an inserted component of a design and/or functional film and/or a tape or an organic sheet of fabric of carbon fibers, glass fibers, and/or natural fibers is placed into the tool before the injection of the plastic melt and,
   further comprising back-injection molding the inserted component with the thermoplastic plastic melt.

8. The method in accordance with claim 4, wherein a projectile is additionally inserted that has a cross-section corresponding to the hollow space of the plastic frame and the projectile is driven from the first end of the closed injection molding tool toward the second end, through the previously injected thermoplastic plastic melt by the injected fluid to form a constant inner diameter of the at least one hollow space, and displace the thermoplastic melt out of the second end of the closed injection molding tool into a secondary chamber.

9. The method in accordance with claim 1, wherein the fluid cools additionally due to a circulation after the formation of the hollow space of the plastic frame.

10. The method in accordance with claim 1, wherein the injected thermoplastic plastic melt is selected from the following group: polyamide, polyamide 12, polyamide 6 or polyamide 6.6, polypropylene, polyethylene, polyether sulfone, polyetherimide, polyetherketone polyphenylene sulfide, polyvinyl chloride, polyester, acrylonitrile butadiene styrene (ABS), polycarbonate/acrylonitrile butadiene styrene (ABC/PC), polycarbonate (PC), and polybutylene terephthalate or polyterephthalate ethylene, with each of these materials being selected individually or in combination, and
wherein the injected thermoplastic plastic melt is reinforced via short fibers and/or long fibers of glass fibers, carbon fibers, and/or natural fibers.

11. The method in accordance with claim 1, wherein the plastic is injected in the injection molding tool as a caprolactam with an associated activator and is polymerized in the heated tool.

12. The method in accordance with claim 1, wherein the injected fluids are water and one or more gases introduced together or sequentially via at least one injector arranged in the tool.

13. The method in accordance with claim 1, wherein a plurality of fluids is injected into the injection molding tool and their individual fluid volume flows or pressure/time profiles are regulated separately from one another, and
wherein the first end of the closed injection tool is a front end of the two-wheeler frame, the second end of the closed injection tool is a rear end of the two-wheeler frame, and the fluid travels through the thermoplastic forming tubes of the two-wheeler frame as the fluid flows to the second end.

14. The method in accordance with claim 5, wherein the parts are a steering head bearing and/or a bottom bracket bearing and/or a motor and/or a storage battery.

15. The method in accordance with claim 6, wherein the parts are a steering head bearing and/or a bottom bracket bearing, a threaded screw fitting for drinking bottles, reflectors, brake lines, cables for transmitting current and/or electronic signals, localization systems, storage batteries, and/or motors.

16. The method in accordance with claim 1, wherein the parts are a middle strut.

17. A method of manufacturing a plastic frame for a two-wheeler having at least one hollow space in an interior by means of plastic injection molding, said method comprising the following steps:
injecting a thermoplastic plastic melt into a closed injection molding tool;
after injecting the thermoplastic plastic melt, injecting at least one fluid into a first end of the closed injection molding tool and flowing the at least one fluid through thermoplastic melt to force a plastic core of the injected thermoplastic plastic melt through a first tube of the closed injection molding tool and a second tube of the of the closed injection molding tool and toward a screw antechamber of the closed injection molding tool, wherein the displacement of the plastic core forms an interior hollow space of the two-wheeler frame and the plastic core is displaced from the first end, through the first tube and the second tube of the closed injection molding tool before being forced into the screw antechamber, wherein the first tube and the second tube of the closed injection molding tool form tubes on opposing sides of the two-wheeler frame; and
at least briefly maintaining fluid pressure in a component interior formed by displacing the injected thermoplastic plastic melt;
wherein the fluid presses the plastic core via a mass back pressure process into the screw antechamber.

18. The method according to claim 17, wherein the passage is a heated passage.

19. A method of manufacturing a plastic frame for a two-wheeler, said method comprising the following steps:
injecting a thermoplastic plastic melt into a closed injection molding tool defining an exterior of the plastic frame;
after injecting the thermoplastic plastic melt, injecting at least one fluid into a first end of the closed injection molding tool and flowing the at least one fluid through thermoplastic melt to force a plastic core of the injected thermoplastic plastic melt through a first tube of the closed injection molding tool and a second tube of the of the closed injection molding tool and toward a second end of the closed injection molding tool, wherein the displacement of the plastic core forms an interior hollow space of the two-wheeler frame and the plastic core is displaced from the first end, through the first tube and the second tube of the closed injection molding tool before being forced out of the second end, wherein the first tube and the second tube of the closed injection molding tool form tubes on opposing sides of the two-wheeler frame; and
at least briefly maintaining fluid pressure in the interior hollow space;
wherein the fluid is introduced into a hose surrounded by the thermoplastic plastic melt such that a direct contact between the fluid and the thermoplastic plastic melt is prevented.

* * * * *